Dec. 19, 1944. F. C. FAHNESTOCK 2,365,630
PRODUCTION OF CATALYTICALLY CRACKED GASOLINE
Filed July 13, 1943
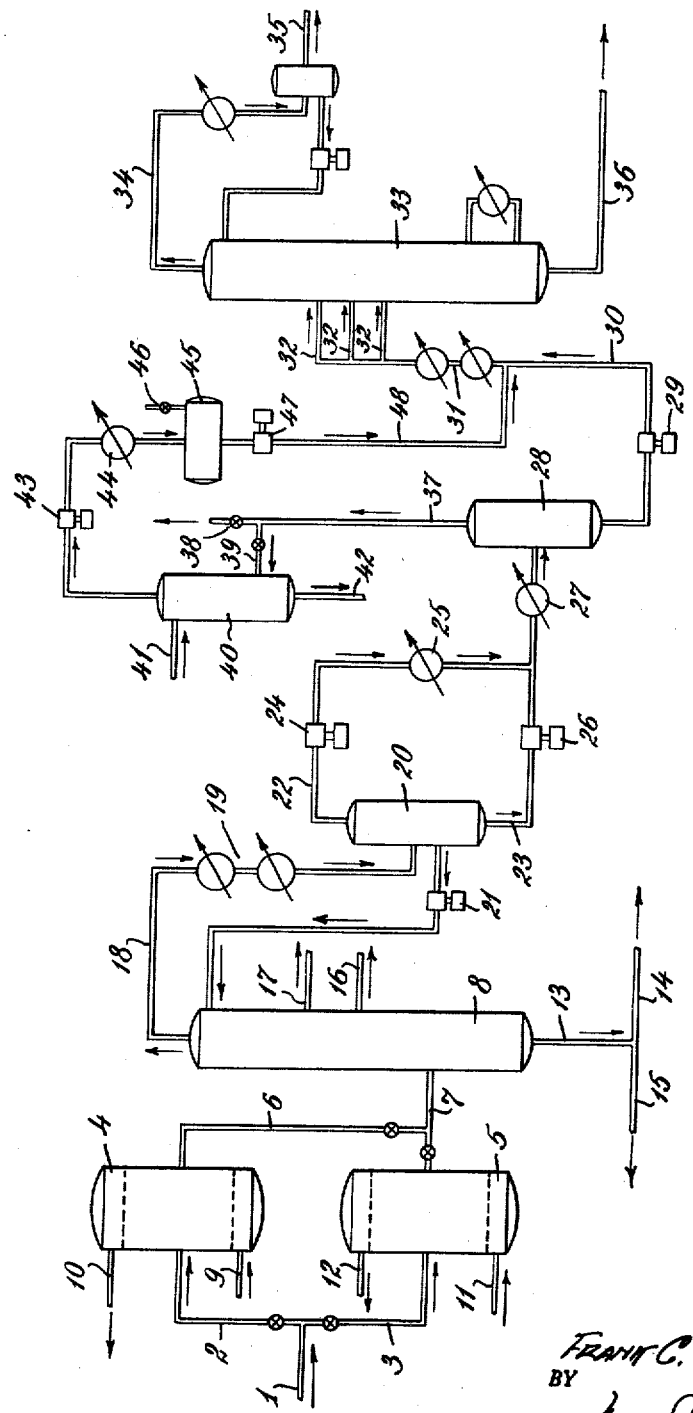
INVENTOR.
FRANK C. FAHNESTOCK
BY
ATTORNEY.

Patented Dec. 19, 1944

2,365,630

UNITED STATES PATENT OFFICE 2,365,630

PRODUCTION OF CATALYTICALLY CRACKED GASOLINE

Frank C. Fahnestock, Wenonah, N. J., assignor to Socony-Vacuum Oil Company, Incorporated, a corporation of New York Application July 13, 1943, Serial No. 494,483

3 Claims. (Cl. 196—52)

This invention has to do with the production of gasoline by catalytic vapor phase cracking in the presence of a solid adsorptive contact mass.

As is well known, when a material of gas oil nature, boiling substantially between about 550° F. and 750° F. is heated to temperatures of the order of 800° F. and above and passed into contact with a clay type contact mass, a substantial conversion to gasoline occurs. The solid adsorptive contact mass materials so used, and generally termed clay type catalysts, may include natural and altered natural clays and synthetic materials of the nature of alumina, silica, or various associations and combinations of these things. This contact mass material becomes contaminated during cracking with a combustible substance, spoken of as coke, and is regenerated by burning. Operations conducted in this manner include not only the original cracking of virgin charging stock, but usually also include the recracking of products of the first operation, both light and heavy, for various objects and purposes.

It has been found that when the charging stock, either virgin or recycle, contains material amounts of sulfur, that a distillate is frequently produced which contains corrosive free sulfur and this invention has for its object the provision of a method of handling such sulfur containing stock to produce a distillate product free from this objection.

The invention is based upon the discovery that the corrosive nature of the product, produced by elemental sulfur dissolved in the product, may be traced to the following set of circumstances. When a charge stock containing sulfur is brought into contact with one of these adsorptive solid contact mass materials a portion of the sulfur compounds present in the stock are decomposed, yielding hydrogen sulfide, which passes out of the reactor in admixture with the products of reaction. Another portion, of course, appears in the products as mercaptans. A third portion is deposited upon the contact mass material. When the contact mass material is subjected to a combustion regeneration this last portion of sulfur is oxidized to sulfur dioxide. Such regeneration normally includes a purging with an inert gas before the regenerated contact mass is returned to reaction, but it has been found that very frequently, and contrary to expectation, a very considerable amount of the sulfur dioxide remains in the contact mass and returns with it to the reaction. It is displaced readily, however, during the following reaction, and the products of this reaction will contain both hydrogen sulfide and sulfur dioxide. These two constituents react,

$$2H_2S + SO_2 \rightarrow 2H_2O + 3S$$

to produce elemental sulfur, which is found dissolved in the product.

This reaction of hydrogen sulfide and sulfur dioxide is well known, being frequently used for the production of colloidal sulfur. It has been found, however, that under conditions obtaining in hydrocarbon conversion systems, that the reaction appears to be concentrated in certain portions of the system, or at least that if the hydrogen sulfide and sulfur dioxide mixture be kept out of those particular portions of the system, no deleterious formation of sulfur is experienced. The reaction may take place to an appreciable extent in the fractionator first utilized to separate products of gasoline boiling range from other products of cracking, but if so, it does give rise to corrosive product in the gasoline boiling range. It does not appear to take place in the condensing and collecting equipment normally utilized for the gasoline product. However, if the two gases are present in the stabilizing operation to which both gasoline and gaseous products of reaction are normally subjected, a serious formation and solution of free sulfur occurs.

How this may be avoided may be understood by reference to the drawing attached hereto, the single figure of which shows, in diagram form, a setup of apparatus suitable for practice of the method here disclosed.

In this drawing a gas oil vapor at conversion conditions of temperature and pressure is admitted through pipe 1 to be directed through either pipe 2 or 3 to converter 4 or converter 5 for reaction. Assuming that converter 4 is on reaction, reaction products will pass through pipes 6 and 7 to fractionator 8 and in converter 4 the regeneration medium inlet 9 and the regeneration product outlet 10 will be closed. Converter 5 will be undergoing regeneration with regeneration medium admitted through 11 and regeneration products released through 12. In fractionator 8, the products of conversion are separated to remove as liquid all products heavier than the desired gasoline product fractionation. The principal portion of these heavier products will be a gas oil removed through pipe 13 which may be removed from the system through pipe 14 or may be recycled to processing through pipe 15. Lighter materials, still heavier than the desired gasoline product may be removed as side streams at 16 and 17. The overhead product from fractionator comprising the desired gasoline fraction and lighter normally non-liquid hydrocarbons will be removed by pipe 18, and as explained hereinbefore this vapor will contain hydrogen sulfide originating from sulfur containing compounds in the original charge stock and will also contain some sulfur dioxide originating from the regenerating operation as hereinbefore explained. This overhead product stream is cooled and condensed at 19 and collected in receiver 20 from which a portion of the liquid is returned by pump 21 for fractionator control. In receiver 20, which operates usually at a relatively low pressure, slightly above atmospheric, there is effected an initial separation of gases and liquid gasoline-like product respectively removed through pipes 22 and 23. As is well known, at this point, the liquid gasoline-like product contains dissolved normally gaseous hydrocarbons not desirable in the finished product and the gas stream contains other hydrocarbons desirable in gasoline product, so the gases in pipe 22 are compressed by compressor 24, cooled at 25, and join the liquid material advancing under the pressure of pump 26. The combined stream is usually further cooled at 27 and passed into a high pressure gas separator 28. In this high pressure gas separator, there is again effected a separation of gas from liquid constituents. At this time and under this higher pressure, a more clean division between products desirable in the gasoline fraction and gaseous products not desirable in that fraction is made. The liquid material separated in this separator, however, still contains undesirable normally gaseous hydrocarbons and is forwarded by pump 29 and pipe 30 through heaters 31 to be introduced at 32, 32, 32, into a stabilizing fractionator 33. In this stabilizing fractionator, normally gaseous hydrocarbon materials not desired in the finished gasoline product are removed to pass overhead through pipe 34 and be removed from the system at 35, a stabilized gasoline being taken off at 36.

Returning to high pressure gas separator 28, the gases separated therein contain some hydrocarbons desirable in the finished gasoline product and the normal procedure is to compress them and introduce them at appropriate points into the stabilizer 33 wherein a final complete and effective separation of unwanted normally gaseous materials and wanted liquid materials for a finished gasoline can be effected upon both feed streams. It has been found that these gases separated from high pressure gas separator 28 and containing hydrogen sulfide and sulfur dioxide, when present in stabilizer 33, under the pressure and temperature conditions there obtaining, decompose, giving rise to elemental sulfur which passes out of the stabilizer in solution in stabilized gasoline and causes it to be corrosive. This unwanted reaction may be avoided by preventing the presence of gaseous products of reaction containing hydrogen sulfide and/or sulfur dioxide from being present in the stabilizer, as by taking the gases removed from the separator 28 by pipe 37 and discarding them from the system through pipe 38. Since these gases contain some recoverable gasoline, it is preferable to treat them in the following manner.

They are passed through pipe 39 into a scrubbing tower 40 and are therein scrubbed with a reagent capable of effecting a substantial removal either of hydrogen sulfide or of sulfur dioxide or both. An effective medium for this purpose is an aqueous solution of a caustic alkali such as sodium hydroxide which may be introduced through pipe 41 and removed through pipe 42. Other reagents such as those carbonate solutions, organic amine solutions, or phenolate solutions normally used for hydrogen sulfide removal may be used to reduce the content of hydrogen sulfide below reactive levels, or in some cases, a wash merely directed at removal of sulfur dioxide may be used although it is usually better to substantially reduce the hydrogen sulfide content of the gases, since if a slight amount of oxygen be present, hydrogen sulfide may be oxidized to sulfur dioxide and the reaction again initiated. In any event, the scrubbed gases are compressed in compressor 43, cooled in 44, and collected in 45. If desired, a high pressure gas separation may be effected in 45 through the agency of vent 46 with little loss of desirable hydrocarbons. Material collected in 45 is forwarded by pump 47 through line 48 to join the feed to stabilizer 33. By operating in this manner, a complete recovery of desirable gasoline-like products of cracking may be effected without giving rise to the formation of corrosive elemental sulfur in a gasoline product.

I claim:

1. In a process for the conversion of sulphur-containing hydrocarbon charge stocks in the presence of a solid adsorptive catalytic contact mass material alternately utilized in reaction and subjected to an oxidation regeneration, the method of producing gasoline product substantially free of corrosive sulphur which method comprises passing charge hydrocarbon at conversion conditions of temperature and pressure in contact with a contact mass to produce the desired conversion, fractionating from the products of conversion those portions heavier than the desired gasoline product, withdrawing the gasoline vapors and lighter products together from the fractionator, cooling the combined stream to condense the gasoline fraction, separating the uncondensed gases containing hydrogen sulphide and sulphur dioxide from the gasoline, subjecting the uncondensed gases to compression and cooling and recombining them with the liquid gasoline fraction under a higher pressure than that at which the first separation was effected, effecting a second separation of liquid and gases at this higher pressure and passing the liquid from the separation to a stabilizing operation to produce a stabilized gasoline product, while excluding from the stabilizer the sulphur-containing gases separated from the high pressure gas separator.

2. In a process for the conversion of sulfur-containing hydrocarbon charge stocks in the presence of a solid adsorptive catalytic contact mass material alternately utilized in reaction and subjected to an oxidation regeneration, the method of producing gasoline product substantially free of corrosive sulphur which comprises passing charge hydrocarbon at conversion conditions of temperature and pressure in contact with a contact mass to produce the desired conversion, fractionating from the products of conversion those portions heavier than the desired gasoline product, withdrawing gasoline vapors and lighter products together from the fractionator, cooling the combined stream to condense the gasoline fraction, separating the uncondensed gases containing hydrogen sulphide and sulphur dioxide from the gasoline, subjecting the uncondensed gases to compression and cooling and recombining them with the liquid gasoline fraction under a higher pressure than that at which the first separation was effected, effecting a second separation of liquid and gases at this higher pressure, passing the liquid from this separation to a stabilizing operation to produce a stabilized gasoline product, removing the gases from the high pressure gas separator and treating them to substantially reduce their content of hydrogen sulfide, and introducing said cleaned gases, after an intervening compression and cooling, to the stabilizer feed.

3. In a process for the conversion of sulfur-containing hydrocarbon charge stocks in the presence of a solid adsorptive catalytic contact mass material alternately utilized in reaction and subjected to an oxidation regeneration, the method of producing gasoline product substantially free of corrosive sulphur which comprises passing charge hydrocarbon at conversion conditions of temperature and pressure in contact with a contact mass to produce the desired conversion, fractionating from the products of conversion those portions heavier than the desired gasoline product, withdrawing gasoline vapors and lighter products together from the fractionator, cooling the combined stream to condense the gasoline fraction, separating the uncondensed gases containing hydrogen sulphide and sulphur dioxide from the gasoline, subjecting the uncondensed gases to compression and cooling and recombining them with the liquid gasoline fraction under a higher pressure than that at which the first separation was effected, effecting a second separation of liquid and gases at this higher pressure, passing the liquid from this separation to a stabilizing operation to produce a stabilized gasoline product, removing the gases from the high pressure gas separator and treating them to substantially reduce their content of hydrogen sulfide and sulfur dioxide, and introducing said cleaned gases, after an intervening compression and cooling to the stabilizer feed.

FRANK C. FAHNESTOCK.

CERTIFICATE OF CORRECTION.

Patent No. 2,365,630. December 19, 1944.

FRANK C. FAHNESTOCK.

It is hereby certified that error appears in the printed specification of the above numbered patent requiring correction as follows: Page 1, second column, line 21, after the word "does" insert --not--; and that the said Letters Patent should be read with this correction therein that the same may conform to the record of the case in the Patent Office.

Signed and sealed this 10th day of April, A. D. 1945.

Leslie Frazer (Seal)

Acting Commissioner of Patents.

fraction, separating the uncondensed gases containing hydrogen sulphide and sulphur dioxide from the gasoline, subjecting the uncondensed gases to compression and cooling and recombining them with the liquid gasoline fraction under a higher pressure than that at which the first separation was effected, effecting a second separation of liquid and gases at this higher pressure, passing the liquid from this separation to a stabilizing operation to produce a stabilized gasoline product, removing the gases from the high pressure gas separator and treating them to substantially reduce their content of hydrogen sulfide, and introducing said cleaned gases, after an intervening compression and cooling, to the stabilizer feed.

3. In a process for the conversion of sulfur-containing hydrocarbon charge stocks in the presence of a solid adsorptive catalytic contact mass material alternately utilized in reaction and subjected to an oxidation regeneration, the method of producing gasoline product substantially free of corrosive sulphur which comprises passing charge hydrocarbon at conversion conditions of temperature and pressure in contact with a contact mass to produce the desired conversion, fractionating from the products of conversion those portions heavier than the desired gasoline product, withdrawing gasoline vapors and lighter products together from the fractionator, cooling the combined stream to condense the gasoline fraction, separating the uncondensed gases containing hydrogen sulphide and sulphur dioxide from the gasoline, subjecting the uncondensed gases to compression and cooling and recombining them with the liquid gasoline fraction under a higher pressure than that at which the first separation was effected, effecting a second separation of liquid and gases at this higher pressure, passing the liquid from this separation to a stabilizing operation to produce a stabilized gasoline product, removing the gases from the high pressure gas separator and treating them to substantially reduce their content of hydrogen sulfide and sulfur dioxide, and introducing said cleaned gases, after an intervening compression and cooling to the stabilizer feed.

FRANK C. FAHNESTOCK.

CERTIFICATE OF CORRECTION.

Patent No. 2,365,630.   December 19, 1944.

FRANK C. FAHNESTOCK.

It is hereby certified that error appears in the printed specification of the above numbered patent requiring correction as follows: Page 1, second column, line 21, after the word "does" insert --not--; and that the said Letters Patent should be read with this correction therein that the same may conform to the record of the case in the Patent Office.

Signed and sealed this 10th day of April, A. D. 1945.

Leslie Frazer (Seal)

Acting Commissioner of Patents.